Feb. 7, 1956
E. N. CASE
2,734,038
PROCESS FOR BREAKING EMULSIONS FORMED IN THE NEUTRALIZATION
OF ACID TREATED PETROLEUM FRACTIONS BY
PARTIAL DEHYDRATION AND SETTLING
Filed July 21, 1951
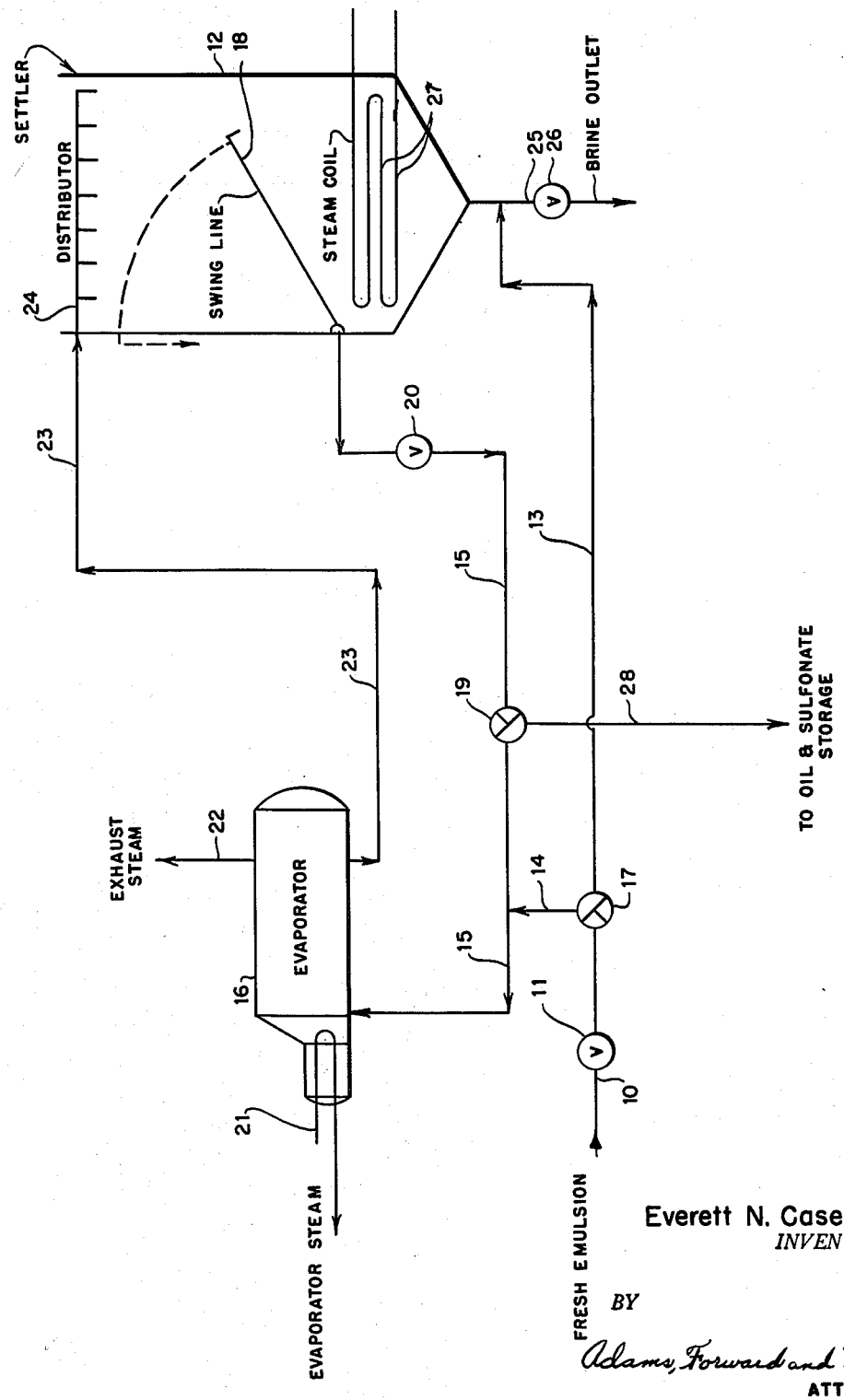
Everett N. Case
*INVENTOR.*
BY
*Adams, Forward and McLean*
ATTORNEYS United States Patent Office 2,734,038
Patented Feb. 7, 1956

2,734,038

PROCESS FOR BREAKING EMULSIONS FORMED IN THE NEUTRALIZATION OF ACID TREATED PETROLEUM FRACTIONS BY PARTIAL DEHYDRATION AND SETTLING

Everett N. Case, Homewood, Ill., assignor to Sinclair Refining Company, New York, N. Y., a corporation of Maine Application July 21, 1951, Serial No. 237,907

5 Claims. (Cl. 252—346)

My invention relates to a process for the recovery of oil and petroleum sulfonates contained in petroleum emulsions produced as the result of the neutralization of acid treated petroleum fractions.

Petroleum emulsions of the oil-in-water variety are formed in the neutralization operation of the process of treating petroleum fractions with concentrated sulfuric acid. The acid treatment of petroleum fractions is applied particularly to the heavier petroleum fractions which are to be used as lubricating oils, lubricating oil base stocks, and the like. In a typical operation, the oil to be treated is pumped to an agitator and acid is added in an amount depending on the character of the oil and the amount of treatment to be effected. The oil and acid mixture is then agitated for about an hour at a temperature of about 90° to 100° F. At the end of this agitation period, water is added to the mixture in an amount of about one to two barrels of water per 60 barrels of oil depending on the amount of water required to make the sludge coalesce. The major portion of the sludge is dropped in about one-quarter of an hour. The mixture is then allowed to settle for an additional period of about three hours, the sludge is again drawn, and the acid oil is withdrawn from the agitator by a swing line and pumped to wash tanks or settlers where neutralization of the acid oil is effected. This neutralization operation is necessary to render the treated oil suitable for use by neutralizing the dissolved sulfonic acids which result from the sulfonation of a portion of the oil during the sulfuric acid treatment, the sulfur dioxide, and the residual sulfuric acid. The neutralization is accomplished by mixing with the acid oil an aqueous alkaline solution, usually a sodium carbonate solution, in an amount sufficient to neutralize the acid content of the acid oil. The mixing is accomplished conveniently by adding the aqueous alkaline solution to the acid oil on the suction side of the transfer pump operating between the agitator and the wash tank or settler so that mixing is obtained during transfer.

During the neutralization of the acid oil with the aqueous alkaline solution, an emulsion is formed as a consequence of the presence of the sulfonates which are emulsifying agents. The neutralized mixture is separated in the wash tank or settler into an oil layer and an emulsion layer by settling alone, by heating and settling, or if neither of these methods is successful, by use of other conventional emulsion breaking treatments or the use of emulsion breaking chemicals. Generally, the heavier the petroleum fraction under treatment, the more difficult is the resolution of the emulsion formed in the neutralization operation of the process. When the separation of the neutralized mixture into oil and emulsion layers has been accomplished, the emulsion layer is withdrawn from the bottom of the wash tank or settler and the oil layer is washed with hot water and treated in a conventional manner, as for example, blown bright or run through a shell still to remove light ends and water and then percolated through clay, to produce the finished stock of the acid treatment operation.

The emulsion that is withdrawn from the wash tank or settler of the acid treatment process contains varying quantities of oil and sulfonates depending on the character of the oil treated, the conditions of treatment, and the degree of separation into oil and emulsion layers obtained in the wash tank or settler. In general, the oil plus sulfonate content of the emulsion will vary from about 20 to 30 per cent by weight of the emulsion. This emulsion, in addition to containing valuable amounts of oil and sulfonates, presents a serious waste disposal problem. The emulsion cannot be dumped to sewer and cannot be disposed of by burning because of the high water and salt concentration. Simple distillation by direct firing is not possible because the salt content of the emulsion forms deposits which interfere with heat transfer and form hot spots which burn out the kettles or shell stills. Simple distillation by indirect heating could be used but yields an oil and petroleum sulfonate product containing all the salt content of the emulsion and therefore requires additional expensive treatment to remove the salt.

I have discovered that the oil and petroleum sulfonate content of petroleum emulsions produced in the neutralization of acid treated petroleum fractions can be recovered from the emulsion with a minimum salt concentration in an economical manner and the problem of disposing of the emulsion eliminated by subjecting the emulsion to a particular dehydration process. The dehydration of the emulsion by the process of my invention is accomplished by removing a portion of the contained water of the emulsion as steam by evaporation and a further portion of the contained water and the major portion of the contained salt as a brine solution by settling.

My dehydration process comprises removing sufficient water by evaporation to concentrate the contained salt of the emulsion into a brine solution which is incompatible with the oil and sulfonate content of the emulsion and which separates out with settling. Therefore, the process of my invention can be performed in a simple, two-stage operation comprising evaporating a sufficient portion of the contained water of the emulsion to produce a brine solution of sufficient concentration to be incompatible with the oil and sulfonate content of the partially dehydrated emulsion and settling to remove the brine solution. However, in order to produce a cleaner oil and petroleum sulfonate product, I prefer to accomplish the dehydration of the emulsion by incremental removal of the contained water by evaporation and of the brine by settling.

Therefore, the preferred process of my invention comprises cycling the emulsion between an evaporator and a settler. In each cycle a portion of the contained water is removed from the emulsion as steam in the evaporator and a further portion of the contained water and a portion of the contained salt settles out of the emulsion as a brine solution in the settler. The cycling of the emulsion between the evaporator and the settler is continued until the emulsion has been substantially dehydrated and then the residue of the emulsion is allowed to stand in the settler until a salt sludge settles out. After this settling period, the upper oil and petroleum sulfonate layer is removed from the settler, fresh emulsion is charged, and the dehydration cycle is repeated.

My process is conducted in a semi-continuous manner by adding fresh emulsion to the dehydration cycle continuously as the water is removed. This addition of fresh emulsion can be continued until the total quantity of partially dehydrated emulsion reaches the capacity of the settler. After the addition of fresh emulsion is discontinued, the cycling of the partially dehydrated emulsion between the evaporator and the settler is continued until the dehydration of the emulsion by the withdrawal of water as steam and as settled brine solution is substantially complete. The residue of the emulsion is then settled in the settler to settle out the salt sludge, the upper oil-sulfonate layer is removed from the settler, fresh emulsion added and the dehydration cycle repeated.

The operation of the process of my invention will be better understood by reference to the accompanying drawing, which is a flow diagram of a suitable embodiment of my process, and the subsequent illustrative example.

Referring to the drawing, fresh emulsion is introduced into the dehydration cycle through line 10 in amount controlled by valve 11. The fresh emulsion is passed through line 13 into the settler 12 or through line 14 into line 15, wihch also carries emulsion from the settler 12 to the evaporator 16, depending on the position of the directional flow control valve 17. Before the start of the dehydration operation, the directional flow control valve 17 is positioned to allow flow of fresh emulsion from line 10 through line 13 to pass the initial charge of fresh emulsion to the settler 12. At the start of the dehydration operation the valve 17 is re-positioned to allow flow of the fresh emulsion from line 10 through line 14 into line 15 for the continuous introduction of fresh emulsion into the dehydration cycle. During the dehydration cycle the directional flow control valve 19 is positioned to allow flow through line 15 from the settler 12 to the evaporator 16. Partially dehydrated emulsion is withdrawn from the settler 12 by means of swing line 18, the inlet of which is positioned within the settler 12 so as to remove the emulsion layer but not the brine layer which forms in the cone shaped bottom of the settler 12. The partially dehydrated emulsion passes from the swing line 18 through line 15 to the evaporator 16 by means of a pump (not shown) in amount controlled by valve 20.

The evaporator 16 is supplied with heat by means of a steam coil 21. A portion of the contained water of the emulsion is removed as steam as the emulsion passes through the evaporator and this steam leaves the evaporator through exhaust steam line 22. This exhaust steam may be vented to the atmosphere or passed to a 15 p. s. i. g. plant exhaust steam line. The partially dehydrated emulsion is returned to the settler 12 from evaporator 16 through line 23 by means of a pump (not shown) and enters the settler 12 through the distributor 24. The distributor 24 is provided as the inlet to the settler 12 in order to maintain the body of partially dehydrated emulsion in the settler in as quiescent a state as possible to allow the settling of the brine solution into the cone shaped bottom of the settler 12. The settled brine solution forms a layer in the cone shaped bottom of the settler 12 and is removed from the settler 12 through line 25 controlled by valve 26 and may be dumped directly to sewer.

After the introduction of the fresh emulsion to the dehydration cycle has been discontinued by shutting off the flow of fresh emulsion by means of valve 11, the cycling of partially dehydrated emulsion between the settler 12 and the evaporator 16 is continued until the residue of the emulsion has been substantially dehydrated. At this point the valve 20 is closed and after all the material has been returned to the settler 12 from the evaporator 16, the residue of the emulsion is settled in the settler 12 to separate the salt sludge. Steam coil 27 is provided in the settler 12 and the settler 12 is preferably insulated in order to maintain the residue of the emulsion in the desired temperature range during this settling period. When the salt sludge has settled, the oil and petroleum sulfonate product which forms the upper layer in the settler 12 is removed from the settler 12 by means of swing line 18. The inlet of swing line 18 is positioned within the settler so that the oil and petroleum sulfonate product is withdrawn without disturbing the bottom layer of salt sludge. During the withdrawal of the oil and petroleum sulfonate layer the directional flow control valve 19 is positioned to allow flow of the product from line 15 through line 28 to oil and petroleum sulfonate storage.

When the product has been completely withdrawn from the settler 12, the directional flow control valve 17 is positioned to allow flow of fresh emulsion from line 10 through line 13 into the settler 12. This fresh emulsion takes up the salt sludge remaining from the previous dehydration cycle and introduces the oil and sulfonate content of the salt sludge into the initial charge of the subsequent dehydration cycle.

The following examle is given as an illustration of the operation of my semi-continuous dehydration process.

The operation of this example is conducted on a seven day dehydration cycle. At the beginning of the first day the settler, having a capacity of approximately 1500 barrels, has been charged with 700 barrels of emulsion and circulation through the evaporator is begun at the rate of 700 barrels per day of fresh emulsion from storage plus 1300 barrels per day of partially dehydrated emulsion from the settler. The evaporator is operated with 125 p. s. i. g. steam so that it is capable of reaching a final maximum temperature of at least about 260° F. Steam make from the evaporator is at the rate of 6560 pounds per hour, and this rate is held constant throughout the complete cycle. These rates are maintained for four days, during which brine is withdrawn from the bottom of the settler. At the end of the fourth day, fresh emulsion addition is stopped, and circulation to the evaporator from the settler is increased to 5000 barrels per day. This circulation is maintained for the fifth day at the end of which dehydration is substantially completed. Exact completion is indicated by a rise of settler temperature to approximately 260° F. The dehydrated residue of the emulsion is settled in the settler for 24 hours at a temperature of about 200° F. to settle out salt sludge. On the seventh day, the oil and petroleum sulfonate product is withdrawn by the swing line, and the initial 700 barrels of fresh emulsion charge is added to the settler. This fresh emulsion charge picks up any salt sludge which may have settled out during the previous day. In this operation approximately 64% of the emulsion by weight is removed as steam from the evaporator and 14% by weight as a brine solution from the settler, yielding an oil and petroleum sulfonate product of approximately 22% of the emulsion. The product contains approximately 3-4% by weight salt and 1% water.

In operating according to my process, whether in the simple two stage operation or the cyclic operation, it is necessary to remove sufficient water from the emulsion to concentrate the contained salt of the emulsion into a brine solution of sufficient concentration to be incompatible with the oil and sulfonate content of the emulsion in order to obtain a separation of the brine solution in the settler. Therefore, the initial evaporation must be conducted so as to remove a minimum of about 30% of the contained water of the emulsion to produce a brine solution of sufficient concentration to obtain settling, but sufficient water must be retained in the partially dehydrated emulsion so that solid salt will not be precipitated. In treating the emulsion according to my process I prefer to operate at pumping rates through the evaporator such that approximately 50 per cent of the contained water of the emulsion passing through the evaporator is removed per pass. This insures both that the brine solution will settle out in the settler and that no solid salt will precipitate. The evaporator should be capable of reaching a final maximum temperature of about 260° F. so that the final product will contain no more than about 1% water by weight.

While the dehydration operation can be conducted continuously through the evaporator, I have found that it is possible to insure a maximum brine withdrawal if circulation between the evaporator and the settler is interrupted at the point where the water concentration of the partially dehydrated emulsion is aprpoximately 20 per cent by weight. At this point the maximum brine layer will form and therefore such interruption insures a minimum volume of water to be evaporated and a minimum concentration of salt in the oil and petroleum sulfonate product. The interruption should be of sufficient duration to allow the partially dehydrated emulsion to settle for a period of approximately 4 to 6 hours in the settler.

During the final settling period to settle out the salt sludge the temperature of the residue of the emulsion collected in the settler is preferably maintained at about 200° F. The salt sludge that remains after the removal of the oil and petroleum sulfonate layer of one dehydration cycle is taken up in the fresh emulsion charge to the settler at the start of the subsequent dehydration cycle so that the oil and sulfonate value of the salt sludge is not discarded. Therefore, only steam and brine solutions are withdrawn from the emulsion and these present no disposal problem.

I claim:

1. A process for the recovery of the oil and petroleum sulfonate content from petroleum emulsions produced in the neutralization of acid treated petroleum fractions which comprises removing an amount of the contained water of the emulsion by evaporation to concentrate the contained salt of the emulsion into a brine solution of sufficient concentration to be incompatible with the oil and petroleum sulfonate content of the emulsion, said amount being at least about 30% of the water of the emulsion with sufficient water being retained so that solid salt will not be precipitated, settling the partially dehydrated emulsion, and recovering the upper oil and petroleum sulfonate layer.

2. A process for the recovery of the oil and petroleum sulfonate content from petroleum emulsions produced in the neutralization of acid treated petroleum fractions which comprises cycling the emulsion between an evaporator and a settler to effect substantial dehydration of the emulsion by withdrawing a portion of the contained water of the emulsion from the evaporator as steam and by withdrawing a further portion of the contained water and a major portion of the contained salt from the bottom of the settler as a brine solution; collecting the substantially dehydrated residue of the emulsion in the settler; settling the residue to settle out a salt sludge; and removing the upper oil and petroleum sulfonate layer from the settler.

3. A process for the recovery of the oil and petroleum sulfonate content from petroleum emulsions produced in the neutralization of acid treated petroleum fractions which comprises cycling the emulsion between an evaporator and a settler to effect substantial dehydration of the emulsion by withdrawing a portion of the contained water of the emulsion from the evaporator as steam and by withdrawing a further portion of the contained water and a major portion of the contained salt from the bottom of the settler as a brine solution; adding fresh emulsion to the cycle continuously but in a total amount such that the total quantity of the partially dehydrated emulsion does not exceed the capacity of the settler; discontinuing the addition of fresh emulsion to the cycle before the total quantity of the partially dehydrated emulsion exceeds the capacity of the settler; continuing the cycling of the emulsion between the evaporator and the settler after the addition of fresh emulsion has been discontinued; collecting the substantially dehydrated residue of the emulsion in the settler; settling the residue to settle out a salt sludge; and removing the upper oil and petroleum sulfonate layer from the settler.

4. The process of claim 3 in which approximately 50 per cent of the contained water is removed per pass through the evaporator and in which the settling of the residue of the emulsion is conducted for about 24 hours at a temperature of about 200° F.

5. The process of claim 3 in which the cycling of the emulsion between the evaporator and the settler is interrupted at a point where the water content of the emulsion is approximately 20 per cent by weight; collecting the partially dehydrated emulsion in the settler at this point, and settling for a period of about 4 to 6 hours before continuing the cycling of the partially dehydrated emulsion.

References Cited in the file of this patent

UNITED STATES PATENTS

| | | |
|---|---|---|
| 1,299,590 | McKibben | Apr. 8, 1919 |
| 1,833,618 | Pew | Nov. 24, 1931 |
| 1,879,849 | Hunter | Sept. 27, 1932 |
| 2,194,269 | Rogerson | Mar. 19, 1940 |
| 2,370,277 | Wethly | Feb. 27, 1945 |

OTHER REFERENCES

Gurwitsch et al., The Scientific Principles of Petroleum Technology, Chapman and Hall Ltd., 11 Henrietta Street, London, W. C. 2 (1932), pp. 435 and 436.